Oct. 4, 1932.  W. A. SUSSMAN  1,880,999
SUBMARINE RESCUE APPARATUS
Filed Aug. 15, 1931  3 Sheets-Sheet 1
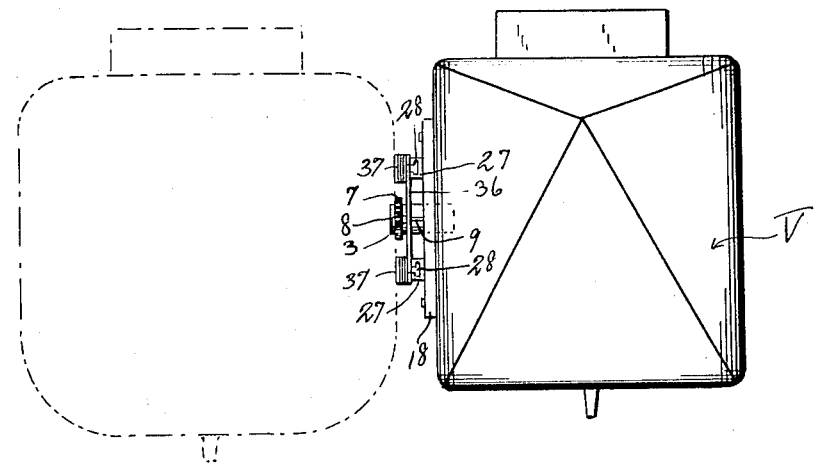
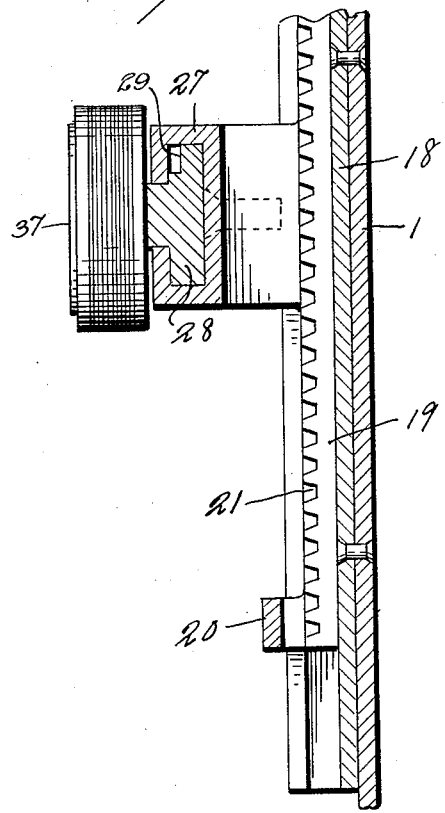
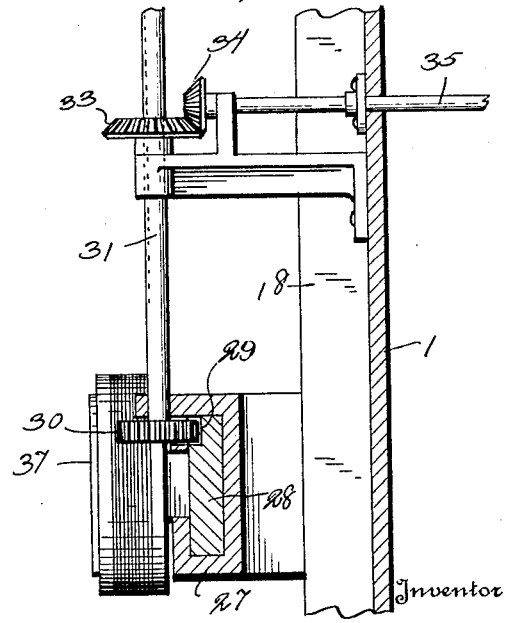
Inventor
W. A. Sussman
By Watson E. Coleman
Attorney

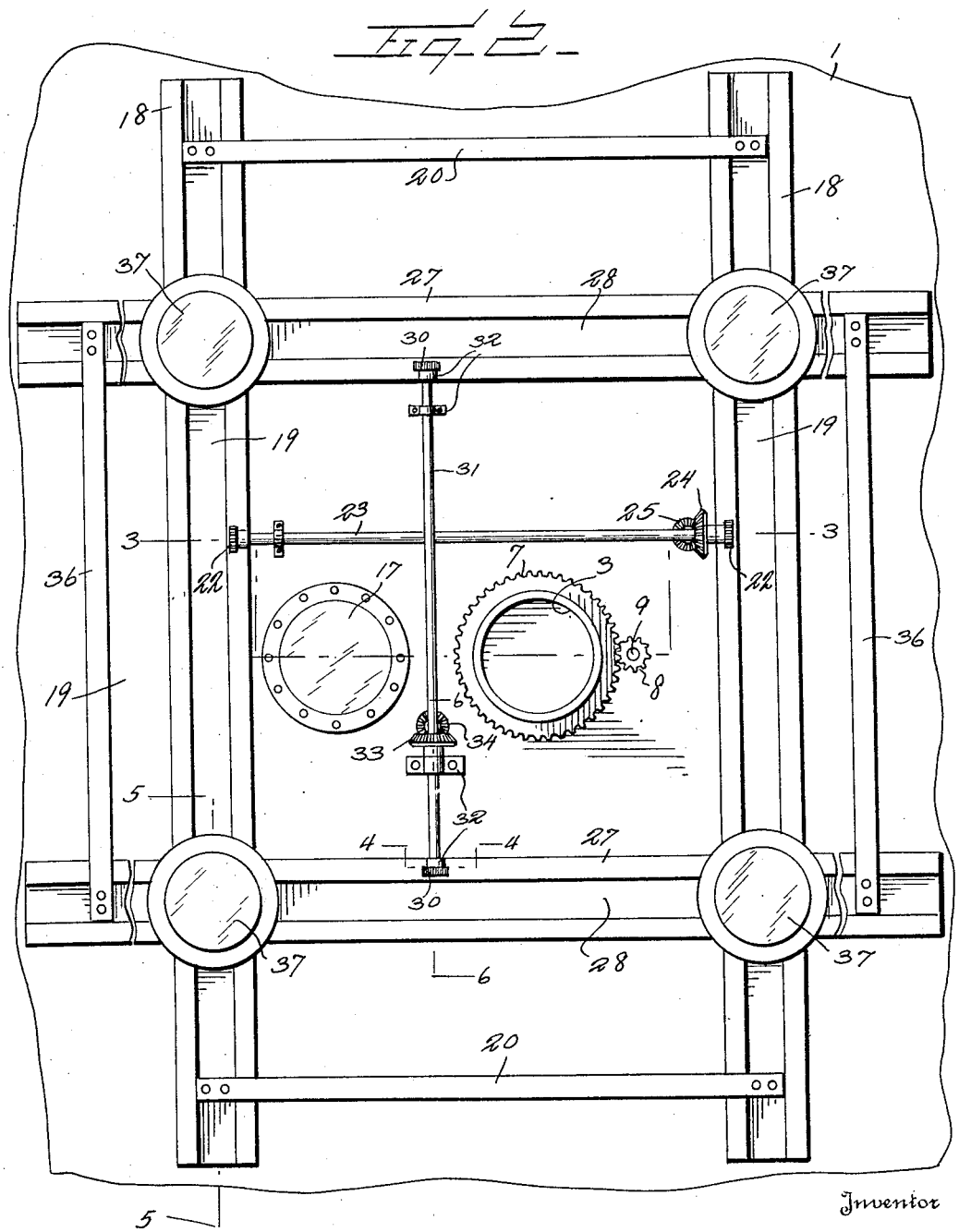

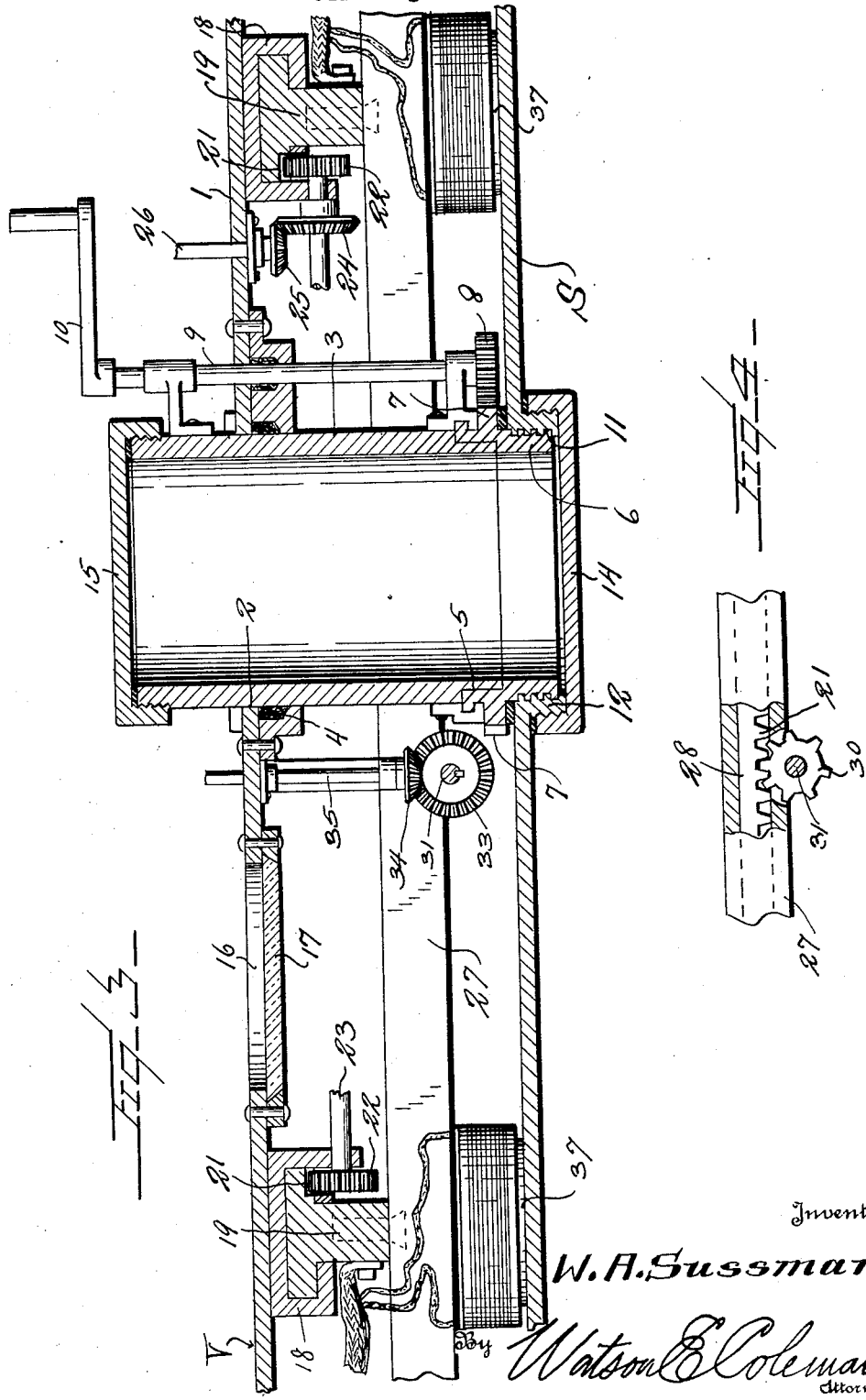

Patented Oct. 4, 1932

1,880,999

UNITED STATES PATENT OFFICE

WALTER A. SUSSMAN, OF BROOKLYN, NEW YORK

SUBMARINE RESCUE APPARATUS

Application filed August 15, 1931. Serial No. 557,362.

This invention relates to a submarine rescue apparatus, and it is an object of the invention to provide an apparatus of this kind wherein the crew or other occupants of a sunken submarine may be readily taken off.

Another object of the invention is to provide an apparatus of this kind which comprises a submarine vessel having means for effectively holding such vessel to a sunken submarine and wherein the vessel is provided with an escape conduit or tube adapted to be operatively engaged within an escape hatch comprised in the structure of the sunken submarine.

A further object of the invention is to provide an apparatus of this kind comprising a submarine vessel carrying an escape conduit or tube and wherein said conduit or tube is supported by the vessel in a manner to permit said conduit or tube to be adjusted in various directions with respect to the vessel so that said conduit or tube may be brought into effective attachment within an escape hatch provided on the sunken submarine.

Furthermore, it is an object of the invention to provide means operable from within the vessel for effecting the desired adjustment of the conduit or tube for obtaining the desired connection of the conduit or tube with the sunken submarine.

The invention consists in the details of construction and in the combination and arrangement of the several parts of my improved submarine rescue apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view of a diagrammatic character showing a vessel provided with my improved apparatus in rescuing relation with respect to a sunken submarine, the sunken submarine being diagrammatically indicated by broken lines;

Figure 2 is an enlarged fragmentary elevational view of a portion of the vessel and the exterior parts of the apparatus carried by the vessel;

Figure 3 is a sectional view taken substantially on the line 3—3 of Figure 2;

Figure 4 is a fragmentary detail sectional view taken substantially on the line 4—4 of Figure 2;

Figure 5 is a detail sectional view taken substantially on the line 5—5 of Figure 2;

Figure 6 is a detail sectional view taken substantially on the line 6—6 of Figure 2.

My improved rescue apparatus as herein disclosed comprises a submarine vessel V adapted to be propelled in a conventional manner or submerged or raised as is now well known. At a suitable point a side wall 1 of the hull of the vessel V is provided with an opening 2 preferably circular and also preferably about twenty-four inches in diameter. Snugly disposed through the opening 2 is an elongated rigid escape conduit or tube 3 of desired length and which has associated therewith desired packing 4 to prevent leakage around the tube or conduit 3 within the vessel V.

The outer end portion of the tube or conduit 3 has in swiveled connection therewith, as at 5, an annular member 6. This member 6 has disposed circumferentially therearound a continuous annular rack 7 with which meshes a gear 8 carried by a shaft 9. This shaft 9 extends through the wall 1 within the vessel V and provided with suitable means, such as a crank 10, for rotating the shaft.

The outer portion of the annular member 6 is provided with exterior threads 11 and upon requisite rotation of the shaft 9 the member 6 may be rotated in a direction to cause the same to have threaded engagement within the escape hatch 12 provided on the sunken submarine S. Upon reversed rotation of the member 6 the escape conduit or tube 3 will be freed from the submarine S.

The escape hatch 12 is normally closed by a cap 14 or its equivalent which is applied to or removed from the hatch within the submarine S. The end portion of the escape tube or conduit 3 within the vessel V is also normally closed by a cap 15 or the like.

It is believed to be obvious that the caps 14 and 15 are not removed until after the conduit or tube 3 has been properly engaged within the hatch 12.

To facilitate the connection of the conduit or tube 3 with the submarine S the wall 1 of the vessel V to one side of the opening 2 is provided with a window opening 16 closed by a transparent panel 17. This opening 16 provides means whereby an occupant of the vessel V may readily have visual access to the outer end portion of the conduit or tube 3 to facilitate its engagement within the hatch 12.

The outer face of the wall 1 of the vessel V at opposite sides of the openings 2 and 16 is provided with elongated vertically disposed trackways 18 arranged in parallelism and extending a considerable distance above and below the openings 2 and 16. Slidably engaged with the trackways 18 are the elongated members 19 tied or connected one to the other for unitary movement by the cross members 20. Each of the members 19 is provided along a marginal portion thereof with a rack 21 with which engages a pinion 22 carried by a shaft 23. The shaft 23 is common to both of the pinions 22 and this shaft may be rotatably supported in any desired manner. The shaft 23 also has fixed thereto a bevel gear 24 which meshes with the bevel gear 25 carried by the extended end portion of a shaft 26. This shaft 26 is directed inwardly of the vessel V through the wall 1 and is adapted to have employed in connection therewith any suitable means for rotating the shaft so that the elongated members 19 may be raised or lowered as desired.

At desired points above and below the openings 2 and 16 the members 19 carry the parallel trackways 27 with which are slidably engaged the elongated members 28. Each of these members 28 is provided with a rack portion 29 with which is engaged a pinion 30 carried by a shaft 31. This shaft 31 is vertically disposed and is rotatably supported by the bearings 32. The shaft 31 has keyed thereon for rotation therewith a bevel gear 33 but the shaft 31 is adapted to have independent sliding movement through this gear 33 so that no hinderance or obstruction will be offered to the desired adjustment of the members 19. The gear 33 meshes with a bevel gear 34 carried by the outer end portion of a shaft 35 also extending inwardly of the vessel V through the wall 1. The shafts 35 within the vessel V is adapted to have engaged therewith suitable operating means so that the shaft may be rotated as desired to effect an endwise movement of the members 28 in either direction desired. The members 28 are tied or connected for unitary movement by the cross members 36.

The opposite end portions of the members 28 carry the electro-magnets 37, the operating circuit for which being conventional and in practice being under control of a suitably positioned switch within the rescue vessel V.

When it is desired to effect the rescue of the crew or other persons within a sunken submarine, after location of such sunken submarine the rescue vessel V is submerged and brought up closely adjacent to the sunken ship with the wall 1 close to the hull of the submarine.

The magnets 37 are then energized with the result that the vessel V will be effectively held to the hull of the submarine S. In this initial maneuvering of the magnetic connection is understood that the magnetic connection is effected with the outer end of the conduit or tube 3 reasonably close to the rescue hatch 12 in the submarine S. By proper adjustments of the members 19 and 28 persons within the vessel V will be able to bring the conduit or tube 3 into proper position with respect to the rescue hatch 12 so that upon rotation of the shaft 9 the outer member 6 of the tube or conduit will have desired locking engagement with the rescue hatch. After this connection between the two ships the caps or covers 14 and 15 are removed, thus allowing the occupants of the sunken submarine to pass through the conduit or tube 3 into the rescue vessel V. After the rescue has been completed the cap or cover 15 is removed to position upon the tube or conduit 3 and such tube or conduit freed from the sunken submarine. The rescue vessel will then return to the desired port or otherwise as may be desired, as for example to a larger vessel.

It is to be understood from the foregoing that in the desired adjustment of the conduit or tube 3 to bring the same into proper position with respect to the rescue hatch 12, the rescue vessel V is bodily shifted. This, however, can be done without much resistance due to the balance of the vessel when in submergence. It may be stated at this time that the means for operating the shafts 26 and 35 may be power means.

From the foregoing description it is thought to be obvious that a submarine rescue apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A submarine rescue apparatus comprising in combination with a submarine having an escape hatch, a rescue vessel, a conduit slidably carried by the vessel, a coupling member swivelly engaging the conduit, and means for rotating said coupling member whereby to attach said member to the hatch.

2. A submarine rescue apparatus comprising in combination with a submarine having an escape hatch, a rescue vessel, a conduit slidable through a wall of the vessel, a cap on the end of the conduit within the vessel, a threaded coupling member rotatably engaging the outer end of the conduit and adapted to threadably engage the hatch, teeth carried by the coupling member, and means operable within the vessel and engaging the teeth on the coupling member to rotate said member.

3. A submarine rescue apparatus comprising in combination with a submarine having an escape hatch, a rescue vessel, a conduit slidably carried by the vessel and having a portion disposed outwardly of the vessel and having a portion disposed within the vessel, a threaded coupling member rotatably engaging the outer end of the conduit, means for holding said coupling member in engagement with the conduit, means for rotating the coupling member, and means for mounting said rotating means on the conduit for sliding movement therewith.

4. A submarine rescue apparatus comprising in combination with a submarine having an escape hatch, a rescue vessel, a conduit carried by the vessel and extending through a wall of the vessel and shiftable transversely of the wall, a threaded coupling member swivelly engaging the outer portion of the conduit, means for holding the coupling member in rotatable engagement with the conduit while permitting movement of the conduit relative to the vessel, means for rotating said coupling member, and means for holding the vessel in adjusted position relative to the hatch.

5. An escape apparatus for sunken vessels comprising a conduit, means for securing the conduit to a rescue vessel for movement transversely of a wall of the rescue vessel, swivelled coupling means carried by the outer end of the conduit, and coupling rotating means operable from within the rescue vessel.

6. An escape apparatus for sunken vessels comprising a conduit, means for securing the conduit to a rescue vessel for movement transversely of a wall of the rescue vessel, swivelled coupling means carried by the outer end of the conduit, coupling rotating means operable from within the rescue vessel, and means for mounting said coupling rotating means for movement with the conduit.

7. An escape apparatus for sunken vessels comprising a conduit, means for securing the conduit to a rescue vessel for movement through a wall of the vessel, a cap carried by the inner end of the conduit, a swivelled coupling means carried by the outer end of the conduit, and coupling rotating means carried by the conduit.

8. An escape apparatus for sunken vessels comprising a conduit, means for securing the conduit to a rescue vessel for slidable movement through a wall of the vessel, a threaded coupling means mounted on the outer end of the conduit, a cap on the inner end of the conduit, means for swivelly mounting the coupling means on the outer end of the conduit, and means operable from within the rescue vessel and carried by the conduit for rotating the coupling means.

9. An escape apparatus for sunken vessels comprising a conduit, means for securing the conduit to a rescue vessel for slidable movement through a wall of the rescue vessel, a threaded coupling member mounted on the outer end of the conduit, means for swivelly mounting the coupling means on the conduit, gear teeth carried by the coupling means, and means carried by the conduit and engaging the teeth to rotate the coupling means relative to the conduit.

10. An escape apparatus for sunken vessels comprising pairs of angularly related trackways adapted to be secured to a rescue vessel on the exterior thereof, a conduit within the area of the trackways, means for mounting the conduit for slidable movement transversely of a wall of the rescue vessel, attaching means slidably engaging said trackways to hold the rescue vessel in adjusted position relative to the sunken vessel, a swivelled coupling member carried by the conduit, and coupling operating means carried by the conduit and engaging the coupling means for operation thereby.

11. An escape apparatus for sunken vessels comprising a pair of parallel trackways adapted to be secured to the exterior of a rescue vessel, slides mounted in said trackways, a second pair of trackways secured to said slides in angular relation thereto, slides in said second trackways, attaching means secured to said second slides for attaching the rescue vessel to the sunken vessel, a conduit disposed within the area of said first and second trackways, means for mounting the conduit for slidable movement through a wall of the rescue vessel, and coupling means carried by the outer end of the conduit.

12. An escape apparatus for sunken vessels comprising a pair of parallel trackways adapted to be secured to the exterior of a rescue vessel, slides in said trackways, a second pair of trackways secured to said slides in right angular relation thereto, slides in said second trackways, attaching means carried by the second pair of slides for attaching the rescue vessel to the exterior of a sunken vessel, independent operating means for each pair of said slides whereby the rescue vessel may be adjusted relative to the sunken vessel, and a conduit disposed within the area of the trackways.

13. An escape apparatus for sunken vessels comprising a pair of trackways adapted to be secured to a rescue vessel, slides in said trackways, a second pair of trackways carried by the slides and mounted in right angular relation thereto, slides in said second trackways, electromagnets carried by said second slides for attaching the rescue vessel to the submarine, slide operating means for said first pair of slides whereby to shift the rescue vessel in a plane relative to the sunken vessel, and slide operating means for said second pair of slides whereby to shift the rescue vessel in the same plane in a direction right angularly related to the first plane.

In testimony whereof I hereunto affix my signature.

WALTER A. SUSSMAN.